(12) United States Patent
Desvignes et al.

(10) Patent No.: US 6,559,082 B1
(45) Date of Patent: May 6, 2003

(54) INSULATING REFRACTORY MATERIAL

(75) Inventors: Cecile Desvignes, Saint Marcellin en Forez (FR); Gilbert Rancoule, Marcq-en-Baroeul (FR)

(73) Assignee: Vesuvius Crucible Company, Wilmington, DE (US)

( * ) Notice: Subject to any disclaimer, the term of this patent is extended or adjusted under 35 U.S.C. 154(b) by 0 days.

(21) Appl. No.: 10/129,993

(22) PCT Filed: Nov. 16, 2000

(86) PCT No.: PCT/EP00/13286

§ 371 (c)(1),
(2), (4) Date: Jul. 30, 2002

(87) PCT Pub. No.: WO01/36348

PCT Pub. Date: May 25, 2001

(30) Foreign Application Priority Data

Nov. 18, 1999 (EP) .............................................. 99870239

(51) Int. Cl.⁷ .............................................. C04B 35/14
(52) U.S. Cl. ...................... 501/128; 501/133; 501/154; 266/275; 266/280; 266/286; 75/314; 75/315; 75/324

(58) Field of Search ................................. 501/128, 133, 501/154; 266/275, 280, 286; 75/314, 315, 324

(56) References Cited

U.S. PATENT DOCUMENTS

| 4,623,131 | A | * | 11/1986 | Roberts ........................ 266/280 |
| 4,874,726 | A | | 10/1989 | Klebb et al. |
| 4,950,627 | A | * | 8/1990 | Tokarz et al. ................ 106/602 |
| 5,516,734 | A | | 5/1996 | Kuszyk et al. |
| 5,602,063 | A | | 2/1997 | Dody et al. |
| 5,766,686 | A | | 6/1998 | Perich et al. |
| 6,380,114 | B1 | * | 4/2002 | Brandy ........................ 501/128 |

* cited by examiner

Primary Examiner—Paul Marcantoni
(74) Attorney, Agent, or Firm—James R. Williams

(57) ABSTRACT

The invention concerns a crack-free insulating refractory material made from a composition comprising 20–80% by weight of a ceramic matrix, 5–40% by weight of insulating microspheres, 0.5–15% by weight of one more binders, 5–20% by weight of a metal or a metal alloy able to melt during the preheating or the first minute of use and 0–25% by weight of water. The ceramic matrix is preferably comprised of vitreous and non-vitreous grains.

15 Claims, No Drawings

INSULATING REFRACTORY MATERIAL

BACKGROUND OF THE INVENTION

1. Field of the Invention

The invention relates to an insulating refractory material and a method of making the material, and more specifically to an insulating coating for use in the casting of molten metals.

2. Description of the Related Art

Insulating refractory materials are used in industry, notably in metallurgy, for reducing heat losses and for saving energy. These materials can also be used for coating an article. They can also be used for producing an insulating component in the material itself. They can also be used to produce elements such as panels or bricks that will be used severally to form an insulating unit.

In the continuous casting of steel, refractory components are used for transferring molten steel between various containers, notably between the ladle and the distributor, and the distributor and the continuous casting mold. Thermally insulating these components can, for example, improve the preheating efficiency (when the components are preheated), reduce solidification of the steel on the inside walls of the taphole and, in the case of pouring components used for a distributor, decrease bridging between the casting component and the mold walls. In one example, a sleeve of insulating refractory material fitted on a stopper rod can improve the preheating efficiency by retaining the heat of the burner.

Typically, sheets or mats of paper impregnated with ceramic fibers comprise the insulating refractory material. Although providing good thermal insulation, ceramic papers have several shortcomings. Placement of the ceramic paper requires operations of cutting, placement and gluing that are long and tedious. Furthermore, the handling of sheets or plates of ceramic paper permits the escape of carcinogenic ceramic fibers that can be inhaled by the operators.

An insulating refractory coating for steel casting components is also known (EP 0 296 981). This coating is obtained from a composition of an aqueous suspension containing 30–85% by weight of a finely divided constituent such as fused silica, alumina or zirconia powders and alumina beads, and a ceramic charge of fibers of alumina, silica, zirconia, titanium dioxide or chrome-alumina, or even alumina or zirconia beads. This composition is also comprised of up to 7% by weight of a binder such as sodium hexametaphosphate or sodium silicate, and up to 40% by weight of a glass-generating frit.

Such a coating avoids some of the disadvantages of plates of ceramic paper impregnated with ceramic fibers. In particular, it is more rapid to install because it does not require a large number of operations. In addition, it can facilitate avoiding the presence of ceramic fibers that are dangerous for the health of the operators. However, it presents certain disadvantages. Its thermal insulation characteristics are not very good due to its low porosity (ca. 20%). This porosity is also essentially open, which assures less good thermal insulation characteristics than a closed porosity. Furthermore, it is difficult to deposit a substantial thickness of coating on a casting. To increase the thickness of the coating, it is necessary to preheat the components before coating them, which requires a supplementary stage and implies a supplementary cost. Furthermore, after having deposited a first layer, it is not possible to deposit a second layer because the outer surface of the coating is smooth and impermeable, which does not permit a good adhesion of the second layer.

SUMMARY OF THE INVENTION

The object of the present invention is an insulating refractory material that remedies these shortcomings. Another object of the present invention is to provide an insulating refractory material which does not present cracks or micro-cracks after the preheating or when used.

The insulating refractory material is particularly suitable for the preparation of insulative coatings for relatively wide refractory articles such as for example so-called fish-tail pouring nozzles used for the continuous casting of thin slabs. It has indeed been observed that due to severe surface constraints appearing when such an article is heated, the coating may be subject to peeling.

Such a peeling or a deterioration of the insulating coating must be avoided at all costs. Firstly, an underlayer of protective material (such as a glaze), if present, could be deteriorated by the peeling of the surface layer. In turn, the degradation of the protective layer gives rise to the oxidation of the refractory article constituting the article. Secondly, the partial peeling of the insulative coating exposes portion of the coated article to extremely high temperatures while the remaining portions are still protected and insulated. The thus generated temperature gradient is responsible of an important thermal shock that may damage the article.

DETAILED DESCRIPTION OF THE INVENTION

This insulating refractory material is comprised of 20–80% by weight of a ceramic matrix, 5–40% by weight of insulating microspheres, 0.5–15% by weight of one or more binders, 5–20% by weight of a metal or metal alloy able to melt during the preheating or the first minute of use and up to 25% by weight of water. The matrix can be a matrix of vitreous grains, notably silica, preferably atomized silica; and may also comprise non-vitreous grains such as alumina or magnesia. Preferably, the matrix does not comprise more than 30% by weight of the matrix of non-vitreous grains. Preferably, the matrix comprises between 5 and 20% by weight of non-vitreous grains such as alumina or magnesia.

The metal or metal alloy that might be used according to the invention must be able to melt during the preheating of the coated article (when the article is preheated) or the first minutes of use of the coated article so that the liquid or semi-liquid metal or metal alloy may impregnate the porosity and (micro)voids within the coating. Commonly, the metal or metal alloy will also be oxidized and form metal oxide in situ. According to a particular embodiment of the invention, the metal is therefore selected so as to form upon oxidization a refractory metal oxide. Suitable metals and metal alloys include aluminum, aluminum alloys (such as AA1100, AA5052, etc.), copper, brass, manganese bronze, zinc, and the like. Among these, aluminum is preferred.

The metal or metal alloys may be incorporated in the form of grains or flakes, preferably as grains having an average grain size up to 0.2 mm. The material may contain from 5 to 20% by weight, preferably from 8 to 15% by weight, and more preferably about 10% by weight of metal or metal alloy. It has been observed that the addition of metal or metal alloy increases the thermal conductivity of the final coating and may negatively impact on its insulating properties. Surprisingly, it has been found that these opposite requirements of having a crack-free coating showing good insulating properties could be balanced by selecting an appropriate amount of metal or metal alloy.

To avoid corrosion or aging of the metal or metal alloy in the coating before its use and to increase consequently the shelf life of the coated article, it may be necessary to include an anti-oxidant and an anti-aging agent. The refractory material may comprise up to 0.2% by weight of an anti-corrosion agent. Particularly suitable agents are sodium tripolyphosphate or tetrasodium dipolyphosphate, but other conventional anti-oxidant agents may also be used. Preferably, a conventional anti-aging agent is also used in a conventional amount. The material can also have up to 4% by weight of a deflocculant and up to 20% by weight of colloidal silica. Preferably, it has from to 0.5 to 4% by weight of a deflocculant and from 0.5 to 20% by weight of colloidal silica.

The insulating microspheres may be hollow spheres of a refractory material, which is typically based on silica and/or alumina. In a preferred embodiment, the microspheres comprise 55–65% by weight of silica and 27–33% by weight of alumina.

The binder of the invention impacts the rheology of the insulating material, particularly as an aqueous suspension or slip. The rheology of the insulating material affects its method of application. For example, a particular rheology is required for applying a slip of the insulating material by dipping or immersing the refractory piece into the slip. The formation of a regular and homogeneous coating depends indeed upon the viscosity of the slip. A suitable viscosity for dipping applications is generally higher than 8 Pa.s and preferably higher than 10 Pa.s. Binders that might be used according to the invention are clays of the kaolinite type and organic binders such as the polysaccharides (e.g., dextrine).

The invention also concerns a component, notably for casting steel, having a body of refractory material coated with the insulating material of the invention. The component can also be a composite piece produced partially of the material of the invention. This component can be produced, e.g., cast, in a single operation or formed of several assembled pieces.

The invention also concerns a process for preparing a composition for effecting an insulating coating or making an insulating piece. According to this process:
one or more binders are dissolved in a quantity of water;
a deflocculant is added;
grains of the ceramic matrix (including grains of atomized vitreous silica) are added while agitating the solution to hydrate them and form a slip;
an anti-corrosion agent is added;
microspheres of an insulating material and a metal or metal alloy are added while continuing to agitate the slip to keep it homogeneous.

In a preferred variant of the process, colloidal silica is added after the deflocculant.

The composition used in making the material can be a slip containing from 20 to 70% by weight of atomized vitreous silica grains, from 5 to 40% by weight of insulating 20 microspheres, from 0.5 to 20% by weight of one or more binders, from 3.0 to 15.0% by weight of metal or metal alloy and from 5 to 25% by weight of water. The composition may further comprise up to 4% by weight of a deflocculant, up to 0.15% by weight of an anti-corrosion agent and up to 10% by weight of colloidal silica. Preferably, it further comprises from 0.5 to 4% by weight of a deflocculant and from 0.5 to 10% by weight of colloidal silica. Such a composition may have a viscosity of between 9 to 12 Pa.s.

The invention also concerns a refractory component having the described insulating coating. The invention also concerns a process for coating the refractory component used in the casting of molten metal, particularly steel with the composition of the invention. The process of coating the refractory component includes dipping the component in a composition as described above for a time less than one minute and allowing it to dry in the open air for 2–4 hours. Repeating the process may produce a plurality of insulating layers.

The material of the invention presents numerous advantages over ceramic papers, including ease of application and reduction of hazardous fibers. Additionally, it assures a better thermal insulation because the insulating microspheres provide a greater porosity and a closed pore structure. Furthermore, the quality of the thermal insulation is improved because it is possible to deposit a greater coating thickness on the piece without impairing the insulation characteristics. This thickness can range up to 4 mm in a single layer and up to 7 mm in two layers. Furthermore, the coated articles will present very few cracks or micro-cracks, even after preheating or after the first minutes of use. Finally, it is readily possible to produce insulating pieces totally or partially of this material.

Other characteristics and advantages of the invention will become evident from the following detailed description and the implementation examples.

EXAMPLE I

A slip was prepared having the composition described below. The ingredients were added under continuous agitation by a COUVROT-LAINE brand planetary-type mixer.

| | |
|---|---|
| Water | 12.1% |
| Dextrine | 2.9% |
| Colloidal silica | 7.8% |
| Dolapix CE 64 | 1.7% |
| Fillite SG 500 | 8.6% |
| Clay (HYMOD RF CLAY) | 4.1% |
| Atomized silica | 42.9% |
| Alumina | 10.7% |
| Aluminum (metal) | 9.1% |
| Sodium tripolyphosphate | 0.1% |

Dextrine, an organic binder, was dissolved in the water. Clay of the kaolinite type was added as a second binder and suspension agent. Continuous agitation ensured homogeneity and complete hydration of the clay, thereby avoiding agglomeration. DOLAPIX CE 64, sold by the German company ZSCHIMMER & SCHWARZ AG, was added as a deflocculant. DOLAPIX is a dispersant/deflocculant for raw materials and ceramic masses based on carboxylic acid without alkali, particularly destined for the deflocculation of ceramic oxides, steatites, etc. The aqueous colloidal silica comprising 30% by weight silica was then added. Grains of atomized silica were next introduced into the slip. The grains were obtained from the aqueous colloidal silica. Water was eliminated from the colloid by a hot stream of air to form the grains, which are more or less complete microspheres of silica having a size from 50 $\mu$m to 1.5 mm in diameter. Alumina powder (having a maximum grain-size lower than 45 $\mu$m) was then incorporated into the slip. Insulating microspheres of Fillite SG-500, which comprise alumina-silicate with a particle size between 5 and 500 $\mu$m, were added. The density of alumina-silicate comprising the microspheres was between 2.7 and 2.8 g/cm$^3$, but the apparent density of the microspheres was only 0.6–0.8 g/cm³. The anti-corrosion agent was then added as an aqueous solution and finally, aluminum powder (having a maximum grain-size lower than 200 μm) was incorporated.

A nozzle having an elongated body comprising an alumina-graphite composition was immersed in the slip at a rate of several meters per minute. The nozzle was kept immersed for less than 1 minute, for example 10 seconds. The nozzle was withdrawn slowly from the slip at a rate of less than 3 meters per minute, drained above the slip for less than 2 minute, and allowed to dry in air for 2–4 hours. Optionally, a second coat or subsequent coats could have been applied in the same manner after a dry time of only 45 minutes. The coated nozzle was then dried thoroughly in a kiln at a constant temperature of 100° C. for one hour.

The chemical composition of the coating obtained from this composition, was as follows:

| INGREDIENTS | % (BY WEIGHT) |
|---|---|
| SiO$_2$ | 70.0 |
| Al$_2$O$_3$ | 17.7 |
| Al metal | 9.0 |
| MgO | trace |
| Burning loss | 3.1 |

EXAMPLE II

A preheating sleeve was produced for a tundish stopper rod. The sleeve had a cylindrical part that fits on the outside diameter of the stopper rod and a flared internal part that completely covers the taphole of the distributor. This sleeve was made of the insulating refractory material of the invention by pouring the slip of Example I into a plaster mold.

EXAMPLE III

A pouring spout cover plate was made for the glass industry. The plate was a parallelepiped having a thickness of 50 mm. This plate was made of the insulating refractory material of the invention by pouring the slip of Example I into a plaster mold.

What is claimed:

1. An insulating refractory material made from a composition comprising:
   a) 20–80 wt. % ceramic matrix;
   b) 5–40 wt. % insulating microspheres;
   c) 0.5–15 wt. % at least one binder;
   d) 5–20 wt. % metal adapted to impregnate voids in the material upon heating; and
   e) up to 25 wt. % of water.

2. The material of claim 1, wherein the metal is selected from the group consisting of aluminum, copper, manganese, zinc, and alloys thereof.

3. The material of claim 1, wherein the composition comprises from 8–15 wt. % metal.

4. The material of claim 1, wherein the composition comprises an anti-corrosion agent.

5. The material of claim 1, wherein the ceramic matrix comprises vitreous grains.

6. The material of claim 5, wherein the vitreous grains comprise silica.

7. The material of claim 6, wherein silica comprises atomized silica.

8. The material of claim 1, wherein the ceramic matrix comprises non-vitreous grains.

9. The material of claim 8, wherein the non-vitreous grains are selected from the group consisting of alumina, magnesia and mixtures thereof.

10. The material of claim 1, wherein the insulating microspheres comprise hollow spheres comprising silica and alumina.

11. The material of claim 10, wherein the hollow microspheres comprise 55–65 wt. % silica and 27–33 wt. % alumina.

12. The material of claim 10, wherein the binder comprises an organic binder.

13. An article for casting molten metal comprising a refractory body having an outer surface at least partially comprising by a material made from a composition comprising:
   a) 20–80 wt. % ceramic matrix;
   b) 5–40 wt. % insulating microspheres;
   c) 0.5–15 wt. % at least one binder;
   d) 5–20 wt. % metal adapted to impregnate voids in the material upon heating; and
   e) up to 25% by weight of water.

14. The article of claim 13, wherein a majority of the article comprises the composition.

15. An aqueous composition for the manufacture of an insulating refractory material comprising:
   a) 20–80 wt. % ceramic component;
   b) 5–40 wt. % insulating microspheres;
   c) 0.5–20 wt. % of at least one binder;
   d) 5–20 wt. % metal; and
   e) 5–25 wt. % water.

* * * * *